(12) United States Patent
Vest

(10) Patent No.: US 9,926,798 B2
(45) Date of Patent: Mar. 27, 2018

(54) METHOD FOR MANUFACTURING COMPOSITE FAN ANNULUS FILLER HAVING NANO-COATING

(71) Applicant: Rolls-Royce Corporation, Indianapolis, IN (US)

(72) Inventor: Wade A. Vest, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 349 days.

(21) Appl. No.: 14/820,892

(22) Filed: Aug. 7, 2015

(65) Prior Publication Data

US 2016/0047261 A1   Feb. 18, 2016

Related U.S. Application Data

(60) Provisional application No. 62/036,900, filed on Aug. 13, 2014.

(51) Int. Cl.
| | | |
|---|---|---|
| *F01D 11/08* | (2006.01) | |
| *F01D 11/00* | (2006.01) | |
| *C25D 1/02* | (2006.01) | |
| *C25D 1/08* | (2006.01) | |
| *C25D 5/56* | (2006.01) | |

(Continued)

(52) U.S. Cl.
CPC .............. *F01D 11/008* (2013.01); *C25D 1/02* (2013.01); *C25D 1/08* (2013.01); *C25D 5/56* (2013.01); *F01D 25/28* (2013.01); *F01D 5/288* (2013.01); *F05D 2220/30* (2013.01); *F05D 2220/32* (2013.01); *F05D 2220/323* (2013.01); *F05D 2220/3212* (2013.01); *F05D 2220/36* (2013.01); *F05D 2230/20* (2013.01); *F05D 2230/30* (2013.01); *F05D 2230/31* (2013.01); *F05D 2230/90* (2013.01); *F05D 2240/24* (2013.01); *F05D 2250/191* (2013.01); *F05D 2300/177* (2013.01); *F05D 2300/43* (2013.01); *F05D 2300/611* (2013.01); *Y02T 50/671* (2013.01)

(58) Field of Classification Search
CPC .... F01D 11/008; F01D 25/28; F05D 2220/32; F05D 2220/3212; F05D 2220/323; F05D 2230/30; F05D 2230/90; F05D 2240/24
USPC ........................................................ 264/129
See application file for complete search history.

(56) References Cited

U.S. PATENT DOCUMENTS

| | | |
|---|---|---|
| 5,520,514 A | 5/1996 | Mareix et al. |
| 6,217,283 B1 | 4/2001 | Ravenhall et al. |
| 7,094,021 B2 | 8/2006 | Haubert |

(Continued)

FOREIGN PATENT DOCUMENTS

| | | |
|---|---|---|
| EP | 2090749 A2 | 8/2009 |
| EP | 2108786 A2 | 10/2009 |
| GB | 2484988 A * | 5/2012 |

OTHER PUBLICATIONS

European Search Report, European Patent Application No. 15180607.2-1359, search completed Oct. 30, 2015, 10 pages.

(Continued)

*Primary Examiner* — William P Fletcher, III
(74) *Attorney, Agent, or Firm* — Barnes & Thornburg LLP

(57) ABSTRACT

A method of making a fan annulus filler for use in a fan assembly of a gas turbine engine may include an annulus filler body formed of a polymer. The annulus filler body may include a surface coated with a nanocrystalline coating to form a flow surface.

16 Claims, 6 Drawing Sheets

(51) Int. Cl.
    *F01D 25/28*     (2006.01)
    *F01D 5/28*     (2006.01)

(56)           References Cited

U.S. PATENT DOCUMENTS

| | | |
|---|---|---|
| 7,153,099 B2 | 12/2006 | Queriault et al. |
| 7,931,442 B1 | 4/2011 | Liang |
| 8,529,208 B2 | 9/2013 | Brault et al. |
| 2012/0082541 A1 | 4/2012 | Macchia et al. |
| 2012/0082551 A1 | 4/2012 | Macchia et al. |
| 2012/0082553 A1* | 4/2012 | Eleftheriou .............. F01D 5/147 |
| | | 416/224 |
| 2012/0082783 A1 | 4/2012 | Barnett et al. |
| 2016/0153287 A1* | 6/2016 | Roach ...................... C25D 7/00 |
| | | 415/119 |

OTHER PUBLICATIONS

European Office Action, European Application No. 151806072-1373, dated Dec. 22, 2016, 8 pages.
Li, James C. M.; Chapter 5.4 Deformation Mechanisms of Nanocrystalline Metals; Mechanical Properties of Nanoaystalline Materials; 4 pages; 2011; Pan Stanford Publishing Pte. Ltd.; Singapore.

* cited by examiner

METHOD FOR MANUFACTURING COMPOSITE FAN ANNULUS FILLER HAVING NANO-COATING

CROSS REFERENCE TO RELATED APPLICATIONS

This application claims priority to and the benefit of U.S. Provisional Patent Application 62/036,900 filed Aug. 13, 2014, the disclosure of which is now expressly incorporated herein by reference.

FIELD OF THE DISCLOSURE

The present disclosure relates to components for use in gas turbine engines, and particularly to annulus fillers for attachment to fan assemblies of the gas turbine engines.

BACKGROUND

Gas turbine engines generally include a fan assembly and an engine core. The engine core includes a compressor section, a combustion section, and a turbine section including a plurality of rotation blades. The turbine section is driven by expansion of exhaust gases from the combustion section. The expanding exhaust gases rotate the turbine section, which is coupled to the fan assembly to drive rotation thereof. The fan assembly includes fan blades that are secured to a fan rotor. The fan blades are positioned circumferentially around a fan rotor and include fan annulus fillers located between the fan blades to assist in directing incoming air towards the fan blades.

SUMMARY

The present disclosure may comprise one or more of the following features and combinations thereof.

According to the present disclosure, a fan annulus filler for mounting on a turbine engine includes a filler body with a hook extending therefrom for coupling to a rotor disc, the filler body being made of a polymer, and a nanocrystalline coating disposed on an exterior surface of the filler body.

In some embodiments, the coating has a thickness of about 0.001-0.150 inches at all points along the exterior surface of the body.

In some embodiments, the polymer is selected from the group consisting of polyether ether ketone, acrylonitrile butadiene styrene, polyethylenimine, and Nylon GF. In some embodiments, the nanocrystalline coating is nickel-based alloy coating.

In some embodiments, the body includes a plurality of bores defined therein and extending through the body between one portion of the exterior surface and another portion of the exterior surface. In some embodiments, the coating is disposed within the bores to fill the bores and provide reinforcement pins that extend through the body.

According to another aspect of the present disclosure, a method of making a fan annulus filler for mounting on a turbine engine includes forming an annulus filler body with a polymer and coating an exterior surface of the filler body with a nanocrystalline coating.

In some embodiments, forming the filler body is selected from the group consisting of injection molding and extruding.

In some embodiments, the polymer is selected from the group consisting of polyether ether ketone, acrylonitrile butadiene styrene, polyethylenimine, and Nylon GF.

In some embodiments, the nanocrystalline coating is nickel-based alloy coating. In some embodiments, the method further includes, before coating the body, forming bores penetrating through the body. In some embodiments, the step of coating the body includes filling the bores with the nanocrystalline coating to form reinforcement pins.

In some embodiments, the method further includes, after the step of coating the body, removing the polymer from the nanocrystalline coating to leave a shell of the nanocrystalline coating.

According to another aspect of the present disclosure, a method of making a fan annulus filler for mounting on a turbine engine includes forming an filler body with a polymer, forming holes through the filler body, coating the filler body with a nanocrystalline coating, and removing the polymer from the filler body to form a shell made from the nanocrystalline coating that defines the annulus filler.

In some embodiments, the step of coating the filler body includes filling the holes with the nanocrystalline coating to form reinforcement pins.

In some embodiments, the step of removing the polymer comprises heating the annulus filler to a temperature of about 150-200° F. In some embodiments, the step of removing the polymer comprises heating the annulus filler to a temperature of less than 400° F.

In some embodiments, a melting point temperature of the polymer is lower than a melting point temperature of the coating.

In some embodiments, the step of coating includes applying the nanocrystalline coating to an exterior surface of the body to form a finished surface that requires no machining and forms a flow surface for use in the gas turbine engine.

In some embodiments, the method further includes coating the nanocrystalline coating with a rubberized coating to form a finished surface that requires no machining and forms a flow surface for use in the gas turbine engine.

Additional features and advantages of the fan slider will become apparent to those skilled in the art upon consideration of the following detailed description of the illustrated embodiment exemplifying the best mode of carrying out the invention as presently perceived.

BRIEF DESCRIPTION OF DRAWINGS

The present disclosure will be described hereafter with reference to the attached drawings which are given as non-limiting examples only, in which.

Figure 1:
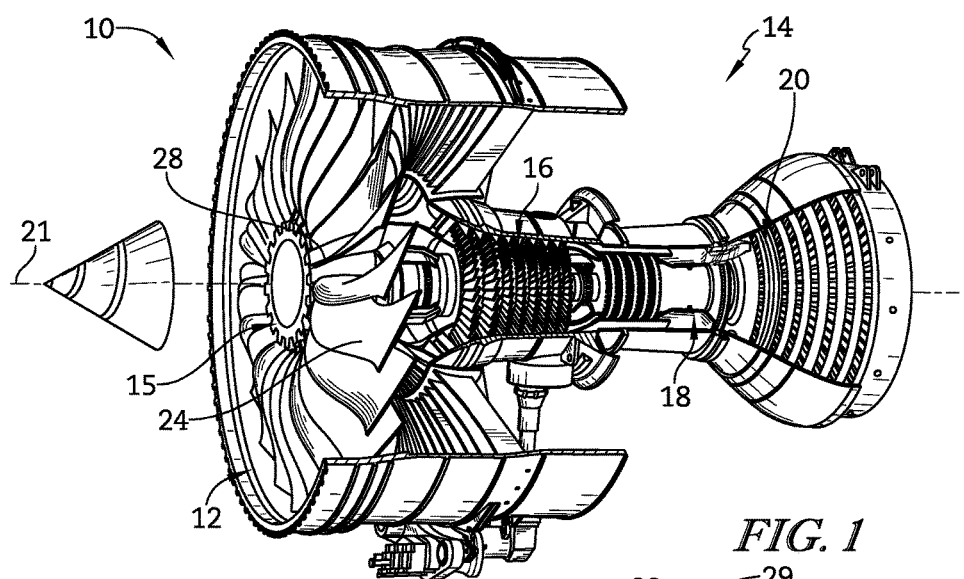
FIG. 1 is a perspective view of a gas turbine engine according to the present disclosure with a portion cutaway and a nose cone removed to show the gas turbine engine includes an engine core and a fan assembly having fans blades separated by fan annulus fillers.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

An illustrative gas turbine engine 10 is cut-away to show that the engine 10 includes a fan assembly 12 and an engine core 14 adapted to drive the fan assembly 12 as shown in FIG. 1. The fan assembly 12 is adapted to push air to provide propulsion for use, for example by an aircraft. The engine core 14 includes a compressor 16, a combustor 18, and a turbine 20 as shown in FIG. 1. The compressor 16 compresses and delivers air to the combustor 18. The combustor 18 mixes fuel with the compressed air received from the compressor 16 and ignites the fuel. The hot, high-pressure exhaust products of the combustion reaction in the combustor 18 are directed into the turbine 20 and the turbine 20 extracts work to drive the compressor 16 and the fan assembly 12.

The fan assembly 12 includes a plurality of fan blades 24 attached at their radially inward ends to a fan rotor 15 as suggested in FIG. 1. The fan blades 24 are illustratively distributed evenly around a circumference of the fan rotor 15. Each fan blade 24 is illustratively separated from the adjacent fan blade by a fan gap 26. A fan annulus filler 28 is illustratively disposed within each fan gap 26 to assist in directing incoming air towards the fan blades 24.

Figure 2:
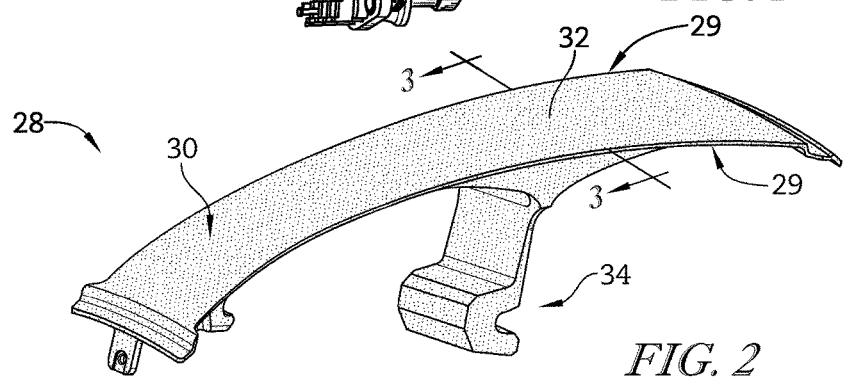
FIG. 2 is a perspective view of an illustrative embodiment of a fan annulus filler from FIG. 1 showing that the annulus filler has a coating.

The fan annulus filler 28 includes a coating 30 illustratively shown in FIG. 2. The coating 30 is illustratively disposed on an all exterior portions of the annulus filler 28. The annulus filler 28 includes a flow surface 32 formed by the coating 30 on a top side thereof. The annulus filler 28 includes sides 29 each configured to receive a seal. The annulus fill includes a hook 34 illustratively extending from a bottom side for connection to the fan rotor 15 of the fan assembly 12.

Figure 3A:
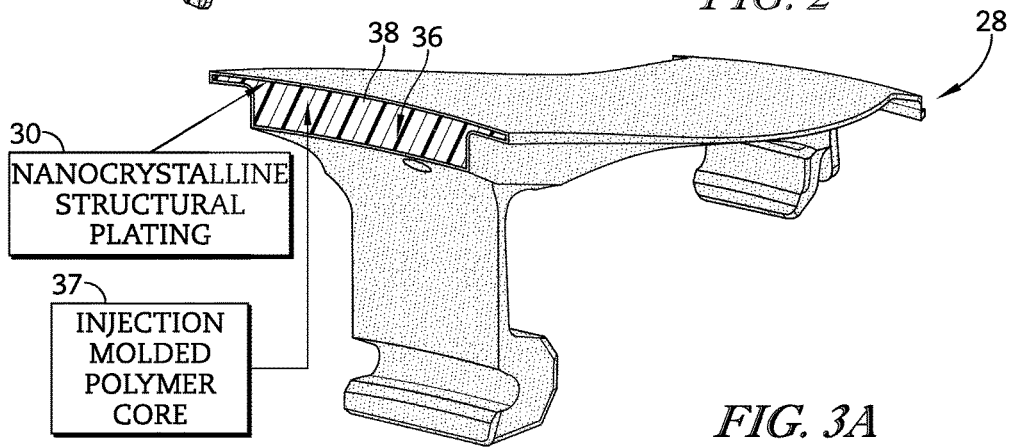
FIG. 3A is a perspective view of the fan annulus filler of FIG. 2 cut away across line 3-3 showing that the body includes a polymer core and the coating is a nanocrystalline structural plating.
Figure 4:
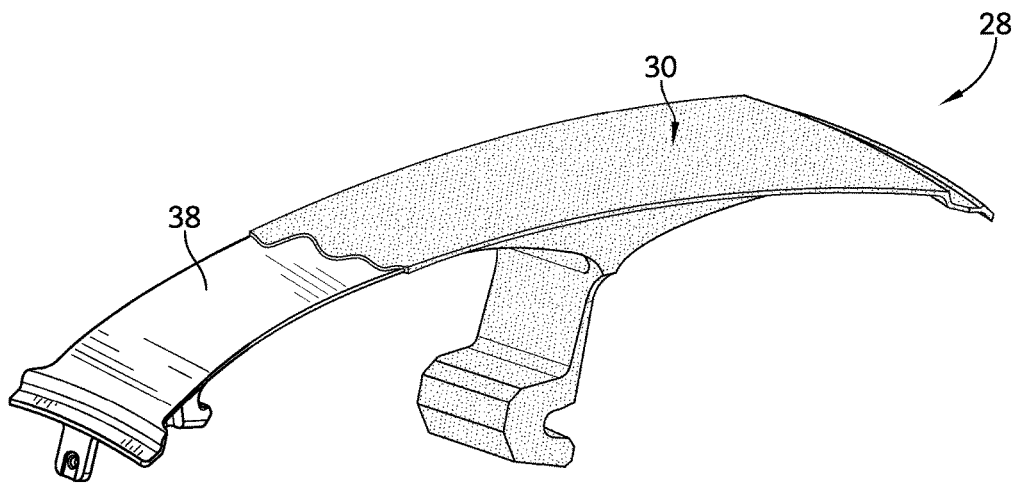
FIG. 4 is a perspective view of the fan annulus filler of FIG. 2 having a portion of the coating cut away to show the core of the body.

As illustratively suggested in the cross-section of FIG. 3A, the annulus filler 28 includes a body 36. The body 36 is illustratively formed of a core material and includes an exterior surface 38 onto which the coating 30 is disposed as shown in FIG. 4. As suggested in FIG. 3A, the body 36 is illustratively formed of an injection molded polymer core 37. In some embodiments, the body 36 may comprise one or more of polyether ether ketone (PEEK), acrylonitrile butadiene styrene (ABS), polyethylenimine (PEI), and nylon GF. In some embodiments, the body 36 may be formed of a core which has a melting temperature of less than 200° F., and in some embodiments, from about 150 to 200° F.

The coating 30 is illustratively formed of a nanocrystalline coating to form nanocrystalline structural plating. Nanocrystalline is defined as a polycrystalline having a grain size generally of 100 nm or less, but functional equivalents above the 100 nm threshold may suffice depending on their specific characteristics.

In the illustrative embodiment, the coating 30 is disposed with uniform thickness in the range of about 0.001 to 0.150 inches at all points on the exterior of the body 36. In some embodiments, the coating 30 may be disposed with a uniform thickness of about 0.001 to 0.125 at all points on the exterior of the body. In some embodiments, the coating 30 may have different thicknesses each from about 0.001 to 0.150 at different points on the exterior of the body 36 according to performance requirements. For example the coating 30 may be thicker along the flow surface 32 and/or along the hook 34 (i.e., the interface with the fan rotor 15) than along the other portions of the annulus filler 28. Thicker coating along the flow surface 32 and/or hook 34 may increase resistance to impacts during operation of the engine 10. In some embodiments, the coating may include NANOVATE®, for example one or more of N1210, N1010, N2020, and or N2025. In some embodiments, the coating 30 may be disposed on the body 36 such that final dimensions are reached without additional finish machining to form the flow surface 34. In some embodiments, a rubberized coating may be applied onto the coating 30 to form a finished surface as the flow surface 34.

Figure 3B:
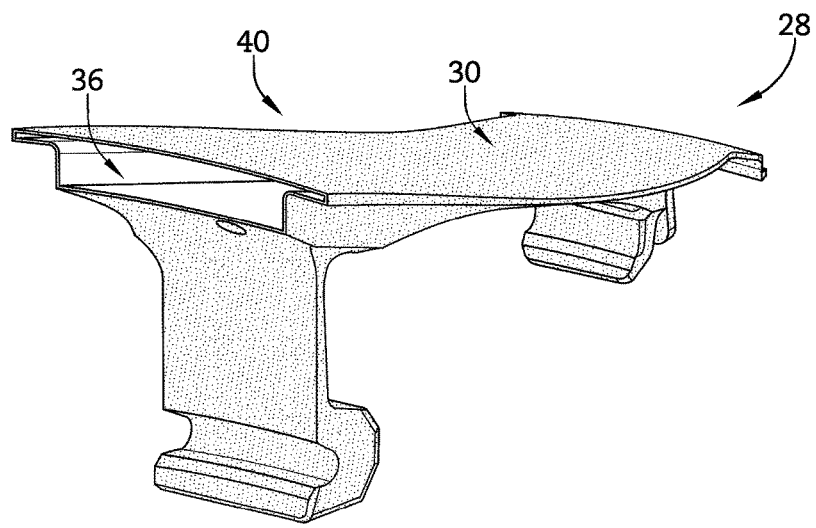
FIG. 3B is a perspective view of another fan annulus filler similar to the fan annulus filler of FIG. 2 cut away to show that the body is hollow after a core has been leeched out to leave a shell of coating, and showing the coating is a nanocrystalline structural plating.

In some illustrative embodiments, as shown in FIG. 3B, the core of the body 36 of the annulus filler 28 may be leached from within the coating 30 to leave a shell 40. The shell 40 is illustratively formed of the coating 30 arranged to define a hollow space inside the body 36 where the core had previously occupied as suggested in FIG. 3B.

Figure 5:
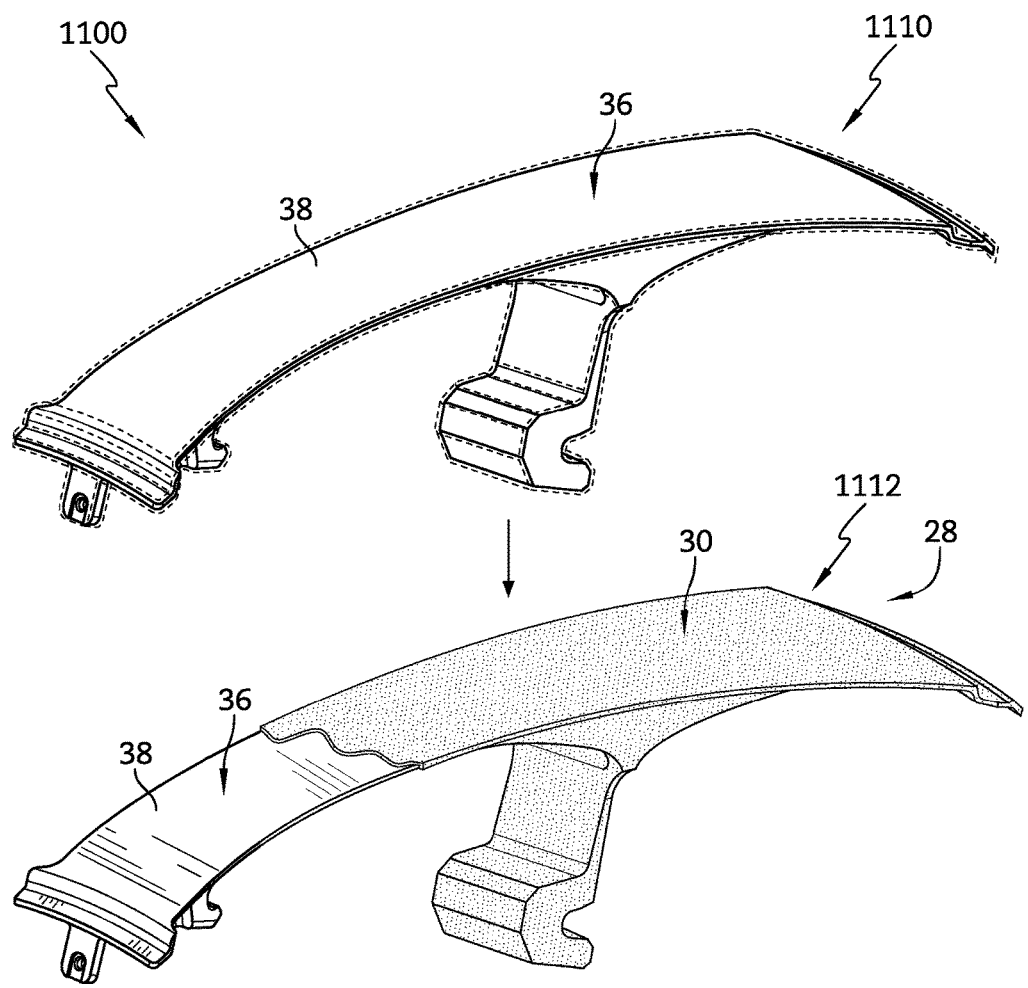
FIG. 5 is an illustrative flow process of making the fan annulus filler of FIG. 2 showing the steps of forming a body from a core, and coating an exterior surface of the body with a nanocrystalline coating.

As suggested in the illustrative flow process 1100 of FIG. 5, the annulus filler 28 is formed in stages 1110, 1112 depicted from top to bottom, including forming the body 1110 and coating the body 1112. In the illustrative embodiment, the stage 1110 of forming the body 36 comprises injection molding from a core material and the coating 30 is depicted in phantom for reference (but has not yet been applied). In some embodiments, the stage 1110 of forming the body 36 may include any suitable manufacturing steps, such as extrusion. The stage 1112 of coating the body is illustratively embodied as electroplating with a nanocrystalline and a portion of the coating 30 has been cut away to show the body 36. In some embodiments, the coating stage 1112 may include any suitable manner of depositing the coating 30 on the body 36 for use in the annulus filler 28, such as spraying.

Figure 6:
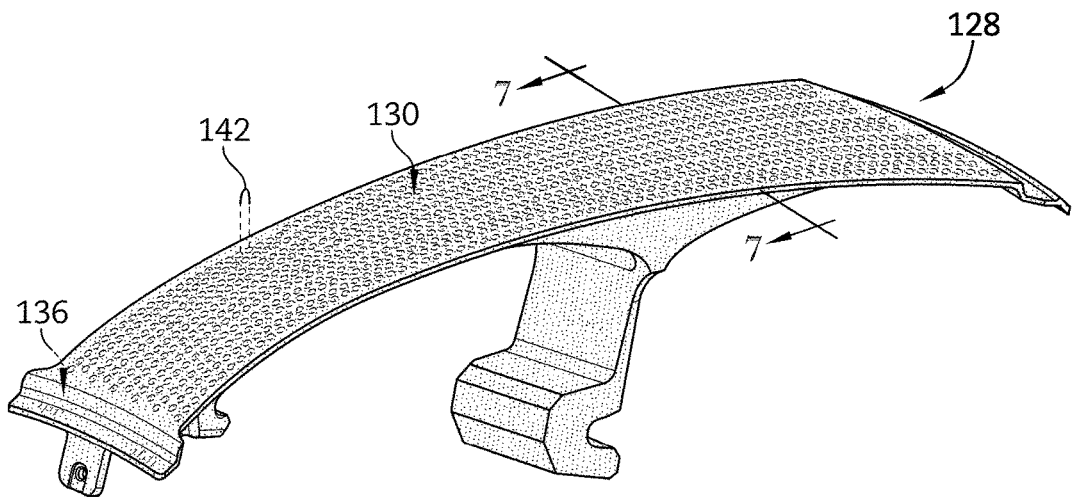
FIG. 6 is a perspective view of another illustrative embodiment of a fan annulus filler adapted for use in an engine like the engine shown in FIG. 1 showing that the coating forms a shell which is reinforced by (phantom) reinforcing pins arranged within the shell.

In another illustrative embodiment, a fan annulus filler 128 is shown in FIG. 6. In the figures, and as used herein, generally like-features of different embodiments are denoted by like-reference numerals, and the description that follows generally describes additions and/or differences in the various features unless otherwise indicated.

The annulus filler 128 illustratively includes a body 136 and reinforcement pins 142 disposed within the body 136. A coating 130 is illustratively disposed around the body 136. The reinforcement pins 142 each illustratively connect to one inner side 144 of the coating 130 and extend radially through the body 136 to connect with another inner side 146 of the coating 130 as suggested in FIG. 7. The reinforcement pins 142 are illustratively formed of the coating 130. The reinforcement pins 142 are illustratively distributed in a relatively even manner along the entire length of the annulus filler 128. In some embodiments, the reinforcement pins 142 may be have non-uniform distribution and may only be distributed in certain portions of the length of the annulus filler 128. In some embodiments, the reinforcement pins 142 may have any orientation relative to the rotating axis 21 of the engine 10.

Figure 7:
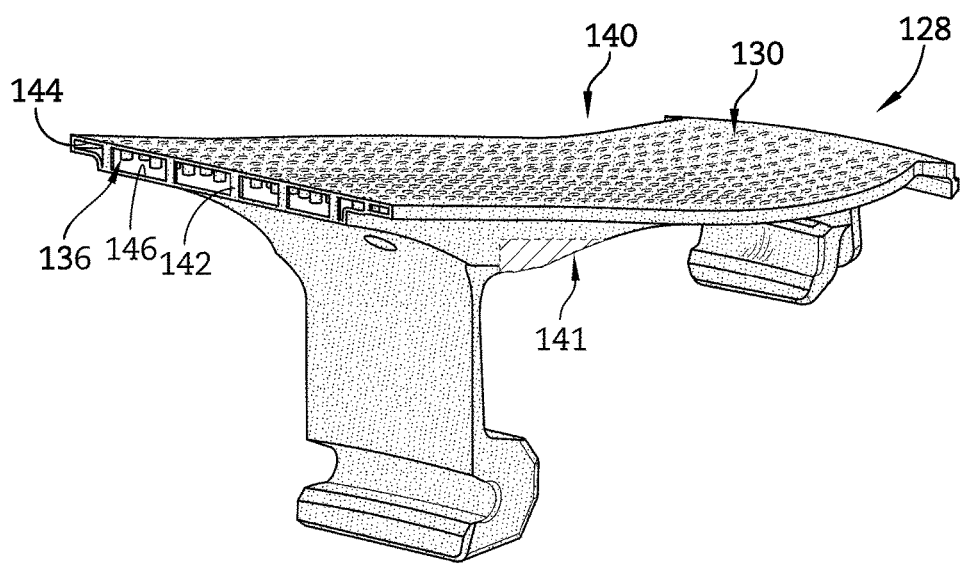
FIG. 7 is a perspective view of the fan annulus filler of FIG. 6 cut away along the line 7-7 showing that the reinforcement pins are disposed within the shell and that the core has been leached out from the body to leave empty space around the reinforcement pins.

The body 130 comprises a hollow cavity shown in FIG. 7 after having a core material leached from within the coating 130. The coating 130 which remains after leaching out the core from the body 136 forms a shell 140. The reinforcement pins 142 remain within the body 136 to provide structural strength for the shell 140. The dimensions and shaped of the annulus filler 128 are illustratively embodied to be the generally the same as other annulus fillers not comprised of a body and coating. However, the reinforcement pins 142 within the shell 140 may permit elimination or reduction of certain dimensions or features, such as eliminating fillets 141 as suggested in FIG. 7, that may be desired for some other annulus fillers, such as machined aluminum annulus fillers.

Figure 8:
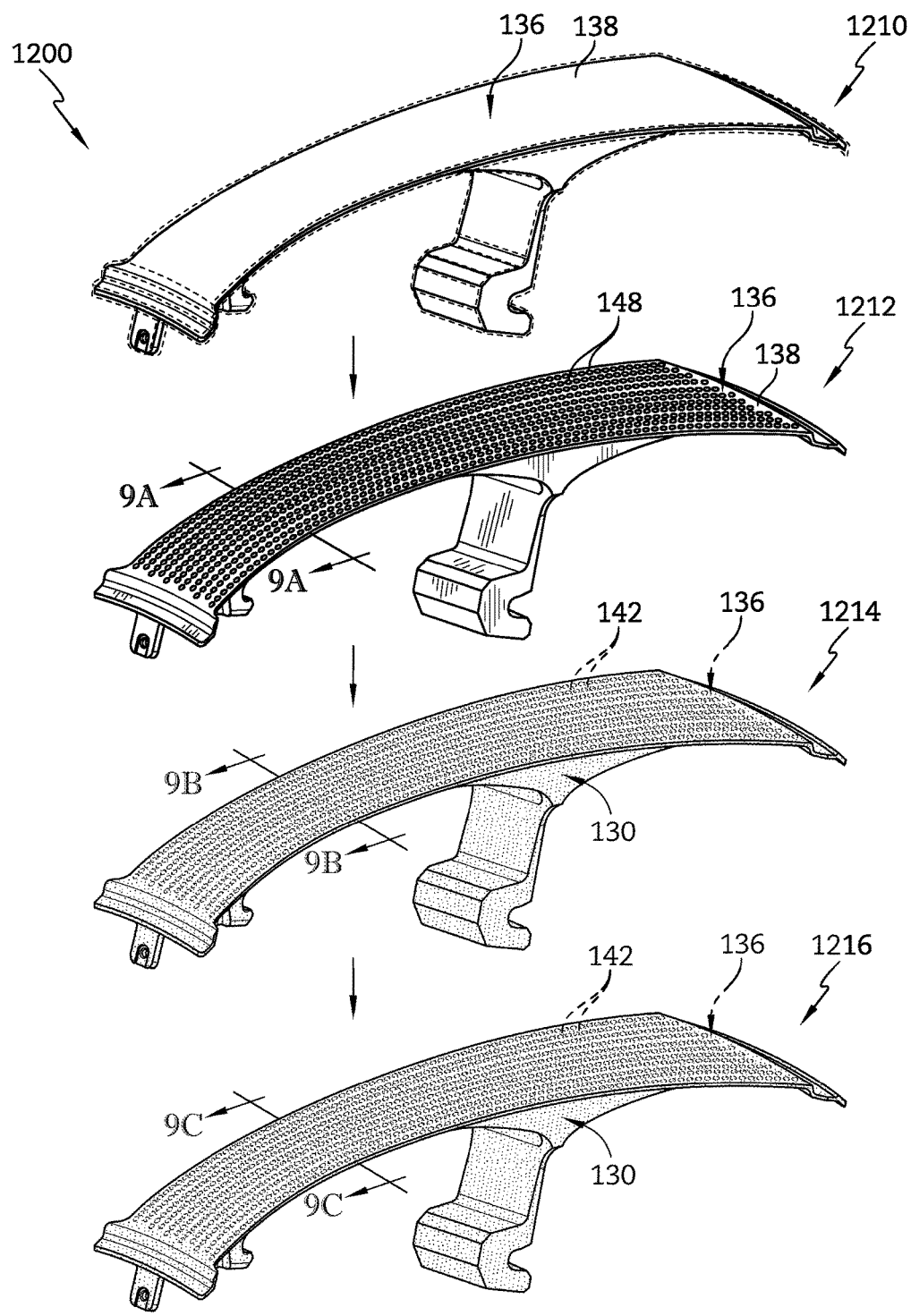
FIG. 8 is an illustrative flow process of making the fan annulus filler of FIG. 6 showing the stages of forming a body with a core, forming bores through the body, coating an exterior surface of the body with a nanocrystalline coating and filling the bores with the nanocrystalline coating to form reinforcement pins within the body, and leaching out the core to leave a shell having reinforcement pins arranged within.

As suggested in the illustrative flow process 1200 of FIG. 8, the annulus filler 128 is formed in stages depicted from top to bottom, including stage 1210 forming the body 136 with a core, stage 1212 forming bores 148 in the body 136, stage 1214 coating the body 136 with the coating 130 and filling the bores 148 with the coating 130 to form the reinforcement pins 142, and stage 1216 leaching out the core from within the body 136. In the stage 1210 of forming the body 136 illustratively includes extruding the body 136 from a polymer core.

Figure 9A:
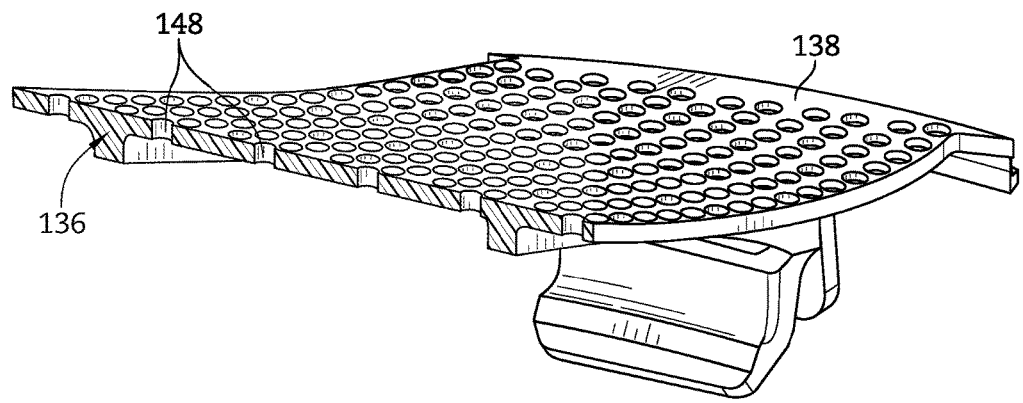
FIG. 9A is a perspective view of a cross-section of the fan annulus filler from the flow process of FIG. 8 cut away along the line 9A-9A to show that, after the stage of forming bores through the body, the bores penetrate through the core of the body.

The stage 1212 of forming bores 148 in the body 136 includes drilling bores 148 through the body 136. In some embodiments, bores 148 may be formed by any suitable manner such as being molded in place during the stage of forming the body 136. A cross-section taken along the line 9A-9A is suggested in FIG. 9A showing that the bores 148 penetrate through the body 136.

Figure 9B:
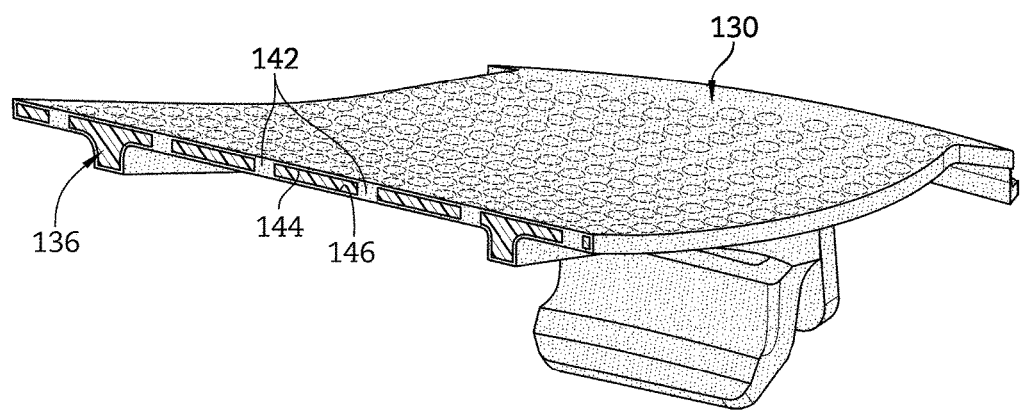
FIG. 9B is a perspective view of a cross-section of the fan annulus filler from the flow process of FIG. 8 cut away along the line 9B-9B to show that, after the stage of coating an exterior surface of the body with a nanocrystalline coating and filling the bores with the nanocrystalline coating to form reinforcement pins, the reinforcement pins are formed within the body and the core remains within the body.

In the stage 1214, coating 130 is applied to an exterior surface 138 of the body 136 and the coating 130 fills the bores 148 to form the reinforcement pins 142. A cross-section taken along the line 9B-9B is shown in FIG. 9B showing that the reinforcement pins 142 are formed of coating 130 filling the bores 148 and extending through the body to connect on one end with an inner side 144 of the coating 130 and to connect on another end with another inner side 146 of the coating 130. As suggested in FIG. 9B, at this point in the flow process, the reinforcement pins 142 have been formed but the core still fills the body 136 as it has not been leached out.

Figure 9C:
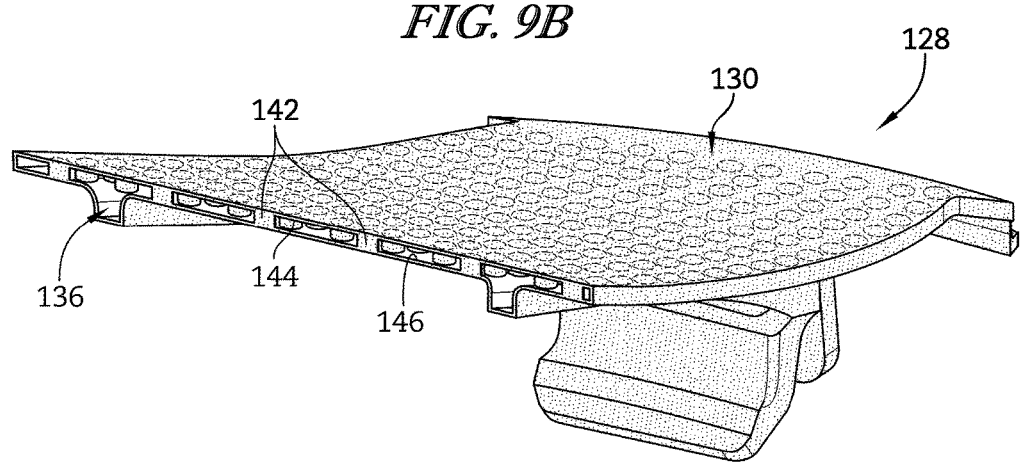
FIG. 9C is a perspective view of a cross-section of the fan annulus filler from the flow process of FIG. 8 cut away along the line 9C-9C to show that, after the stage of leaching out the core to leave a shell having reinforcement pins arranged within, the reinforcement pins are within the body and the core has been leached out from the body to leave the shell.

In stage 1216, the core of the body 136 is leached out to leave shell 140 formed of the coating 130. In the cross-section taken along line 9C-9C is suggested in FIG. 9C showing that the core has been leached out to leave the shell 140 and such that the body 138 includes a hollow cavity with the reinforcement pins 142 remaining to provide structural support to the shell 140.

The present disclosure is directed to a light-weight, cost-effective annulus filler that is without forged and machined aluminum. Instead, the annulus filler of the present disclosure may include a polymer and a nanocrystalline coating. In some embodiments, the polymer may be leached out from within the coating to leave a shell.

In some embodiments, the core of the body 136 of the annulus filler 128 may not be leached out but may be left inside the coating 130 with the reinforcement pins 142. In some embodiments, the core of the body 136 may be leached out to leave the hollow cavity and may be filled back in with another material. In some embodiments, leaching may include heating the annulus filler 128 to a temperature of no more than 400° F., and in some embodiments no more than 300° F.

Although the present disclosure has been described with reference to particular means, materials, and embodiments, from the foregoing description, one skilled in the art can easily ascertain the essential characteristics of the present disclosure and various changes and modifications may be made to adapt the various uses and characteristics without departing from the spirit and scope of the present disclosure.

What is claimed is:

1. A method of making a fan annulus filler for mounting on a turbine engine, the method comprising the steps of:
   forming an annulus filler body with a polymer; and
   forming at least one bore penetrating through the body,
   coating an exterior surface of the filler body with a nanocrystalline coating and filling the at least one bore with the nanocrystalline coating to form reinforcement pins.

2. The method of claim 1, wherein forming the filler body is selected from the group consisting of injection molding and extruding.

3. The method of claim 1, wherein the polymer is selected from the group consisting of polyether ether ketone, acrylonitrile butadiene styrene, polyethylenimine, and Nylon GF.

4. The method of claim 1, wherein the nanocrystalline coating is nickel-based alloy coating.

5. The method of claim 1, further comprising, after the step of coating the body removing the polymer from the nanocrystalline coating to leave a shell of the nanocrystalline coating.

6. The method of claim 5, wherein the step of removing the polymer comprises heating the annulus filler to a temperature of less than 400° F.

7. The method of claim 1, wherein a melting point temperature of the polymer is lower than a melting point temperature of the coating.

8. The method of claim 1, wherein the step of coating includes applying the nanocrystalline coating to an exterior surface of the body to form a finished surface that requires no machining and forms a flow surface for use in the gas turbine engine.

9. The method of claim 1, further comprising coating the nanocrystalline coating with a rubberized coating to form a finished surface that requires no machining and forms a flow surface for use in the gas turbine engine.

10. A method of making a fan annulus filler for mounting on a turbine engine, the method comprising the steps of:
   forming an filler body with a polymer;
   forming holes through the filler body;
   coating the filler body with a nanocrystalline coating; and
   removing the polymer from the filler body to form a shell made from the nanocrystalline coating that defines the annulus filler.

11. The method of claim 10, wherein the step of coating the filler body includes filling the holes with the nanocystalline coating to form reinforcement pins.

12. The method of claim 10, wherein the step of removing the polymer comprises heating the annulus filler to a temperature of about 150-200° F.

13. The method of claim 10, wherein the step of removing the polymer comprises heating the annulus filler to a temperature of less than 400° F.

14. The method of claim 10, wherein a melting point temperature of the polymer is lower than a melting point temperature of the coating.

15. The method of claim 10, wherein the step of coating includes applying the nanocrystalline coating to an exterior surface of the body to form a finished surface that requires no machining and forms a flow surface for use in the gas turbine engine.

16. The method of claim 10, further comprising coating the nanocrystalline coating with a rubberized coating to form a finished surface that requires no machining and forms a flow surface for use in the gas turbine engine.

* * * * *